No. 894,558. PATENTED JULY 28, 1908.
A. W. WHEATON.
FAUCET.
APPLICATION FILED OCT. 9, 1907.
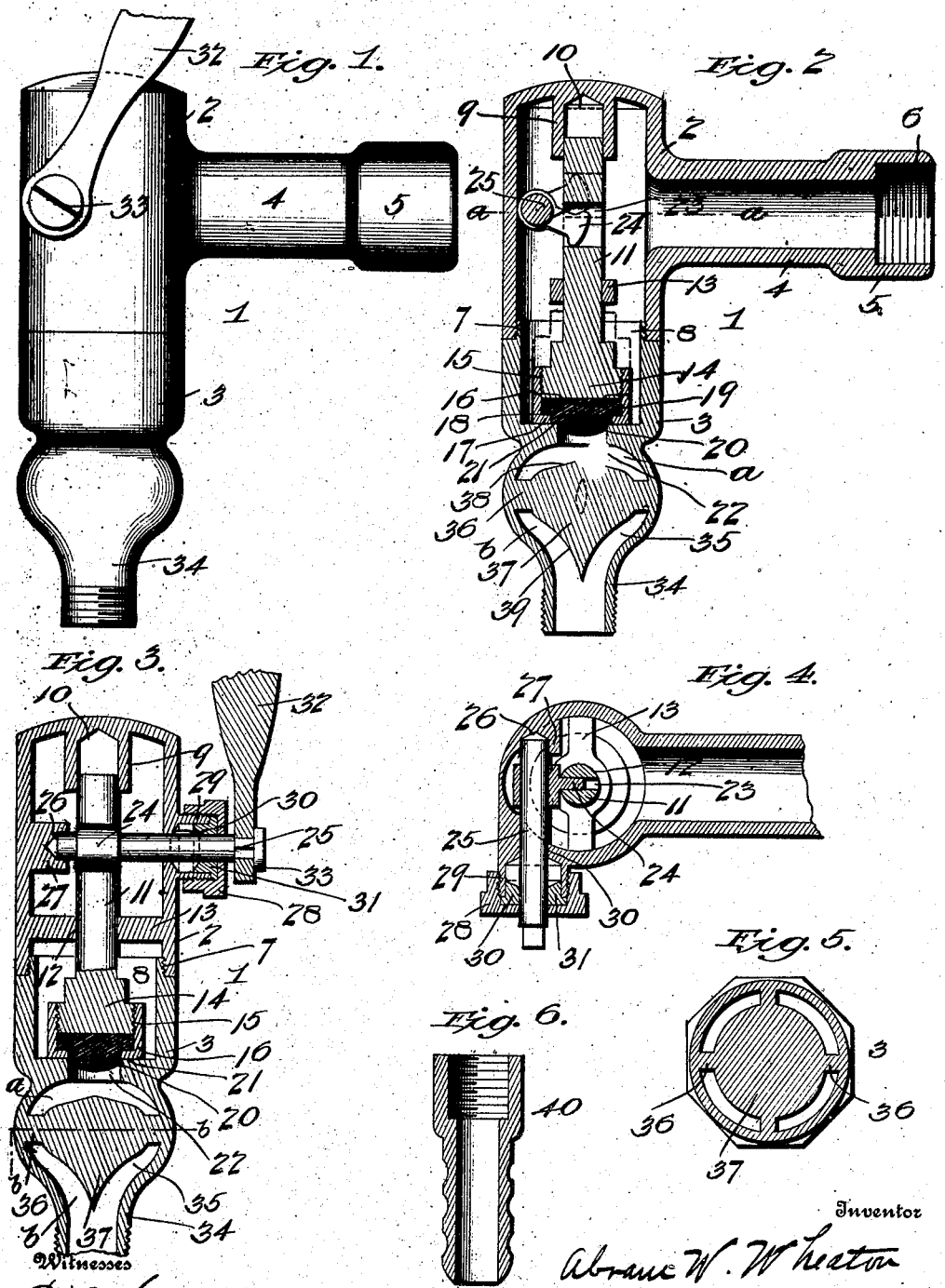

UNITED STATES PATENT OFFICE.

ABRAM W. WHEATON, OF NEWARK, NEW JERSEY.

FAUCET.

No. 894,558.   Specification of Letters Patent.   Patented July 28, 1908.

Application filed October 9, 1907. Serial No. 396,685.

*To all whom it may concern:*

Be it known that I, ABRAM W. WHEATON, a citizen of the United States, residing at Newark, in the county of Essex and State of New Jersey, have invented certain new and useful Improvements in Faucets, of which the following is a specification.

This invention relates to improvements in faucets, which while adapted for general purposes, is especially intended as a beer faucet.

The object of the invention is to provide a simple and durable construction in which the valve may be easily and reliably operated.

A further object is to provide a construction wherein the parts cannot work loose and cause leakage.

Another object is to so construct the casing that the parts can be readily assembled in the first instance, and dissembled in order to reach the internal parts when desirable.

A still further object is to so construct the nozzle of the faucet as to interrupt the direct flow of the beer therethrough, so that the same may be drawn with less foam and consequently prevent great waste, which now occurs.

In the drawings illustrating the invention: Figure 1 is a side elevation of the faucet; Fig. 2 is a central section thereof, the valve being shown seated, in full lines, the raised position being shown in dotted lines; Fig. 3 is a cross section taken on a line diametrically opposite that upon which Fig. 2 is taken; Fig. 4 is a horizontal section taken about on line *a—a* of Fig. 2; Fig. 5 is a horizontal section of the nozzle taken on line *b—b* of Fig. 3; and Fig. 6 is a sectional view of a hose nozzle adapted for attachment to the faucet nozzle, for cleaning the same when desired.
Referring to the drawings, the numeral 1 designates the faucet casing which comprises the upper portion 2 and the lower part 3. The upper part has integral therewith, the tubular extension 4 enlarged slightly at its rear end as indicated at 5, which enlarged portion is internally threaded as indicated at 6, which threads are adapted to receive the threads of a short threaded connection on the beer keg or other thing to which the faucet may be attached. The part 2 is internally threaded at its lower end as indicated at 7 for the reception of the short threaded extension 8 of the part 3, whereby the upper and lower parts of the casing are detachably secured together. The upper part of the casing has formed within it an extension 9 having a socket 10 therein in which works and is guided the valve stem 11 which stem passes through an aperture 12 within a web or cross piece 13 integral with the upper part of the casing. The valve stem carries a head 14 externally threaded as indicated at 15 for the reception of a threaded ring 16 which has an annular flange 17 which forms a shoulder 18 upon which rests the flange 19 of the valve end 20. This end is of compressible material, preferably rubber, the material which is found best adapted for these purposes, and it is adapted to seat upon the shoulder 21 in the lower part of the casing with its end extending slightly down into the opening 22. The valve stem has an opening 23 which receives the extension 24 integral with the horizontal shaft 25, which shaft has a bearing at one end in a socket 26 in a lateral extension 27 in the upper part of the casing, and its other end passes through and has a bearing in a cap 28 which is screwed to the short threaded extension 29 on the side of the faucet. This shaft also has a bearing in an opening 30 in the upper casing part and within a packing 31 held between the screw cap 28 and the extension 29. The outer end of the shaft is squared and is received in the squared opening in the handle 32 by which the shaft is partially rocked in one direction or the other to open or close the faucet as may be desired.

To hold the handle securely upon the shaft, I employ the usual means, that is to say, the screw 33, which is received in a threaded socket in the end of the shaft, which screw when tightened, obviously presses the handle tightly against the shallow shoulder on said shaft.

The lower part of the casting has preferably integral therewith, a nozzle 34 having an approximately spherical chamber 35 therein. Suspended in this chamber by four short webs 36 is a deflector 37 formed with an oval upper surface 38, and an approximately cone shaped lower end 39 upon curves approximately concentric with the wall of the chamber, so that upper passages *a* will be formed which communicate with the lower part of the casing through the opening 22 and passages *b* below the deflector which unites in the nozzle mouth below said deflector.

I preferably thread the nozzle externally which adapts it to receive the internally threaded connection 40. This nozzle 40 is of the usual construction and is adapted to enter the end of the hose connected with any suitable source of water supply. The purpose of this arrangement is to clean the faucet by forcing water through it through the nozzle end.

In assembling the parts, the valve stem and valve are inserted in the upper casing part with the extension 24 on the shaft 25 entering the opening 23 in the valve stem. The lower end of the faucet is then screwed in place which will bring the shoulder 21 in position to form a seat for the valve end 20. When the lever or handle 32 is moved toward the operator, the extension 24 will, by reason of engagement with the stem, raise the valve and open the faucet, and obviously, a reverse movement of the handle will seat the valve. The beer in passing out of the lower casing part through the opening 22 into the nozzle, will pass uniformly over the widened surface of the deflector 37 through the spaces between the webs 36, around beneath said deflector and out of the nozzle.

Claims.

1. A faucet comprising a casing formed of upper and lower separable parts, the upper part having an inlet opening therein, a valve seat in the lower part, a nozzle communicating with the lower part and formed with an approximately spherical chamber therein, a deflector centrally supported within said chamber, so that the liquid passing out of said nozzle will pass over and around said deflector, a valve suitably guided in the casing, and means for operating said valve whereby communication between the casing and nozzle is controlled, substantially as described.

2. A faucet comprising a casing formed of upper and lower separable parts, the upper part having an inlet opening therein, the lower part having a valve seat therein, and a nozzle formed with a substantially spherical chamber communicating with the casing, a deflector centrally supported within the chamber whereby exit passages are formed around said deflector, a valve having a head adapted to seat upon the valve seat in the lower casing part and a recessed stem suitably guided in the casing, a transverse rockable shaft having an extension extending into the recess in the valve stem, and a suitable handle or lever connected with the shaft outside the casing, whereby said shaft may be rocked to open or close the valve, substantially as described.

3. A faucet comprising a casing having an inlet opening in the upper part thereof, and a valve seat in the lower part, a nozzle communicating with the lower part and formed with an approximately spherical chamber therein, a deflector centrally supported within said chamber so that the liquid passing out of said nozzle will pass over and around said deflector, a valve suitably guided in the casing and means for operating said valve, whereby communication between the casing and nozzle is controlled.

4. A faucet comprising a casing formed of upper and lower separable parts, the upper part having an inlet opening therein, the lower part having a valve seat therein, and a nozzle formed with a substantially spherical chamber communicating with the casing, a deflector centrally supported within the chamber whereby exit passages are formed around said deflector, a valve having a recessed stem suitably guided in the casing, a removable head carried by said stem, a transverse rockable shaft having an extension in the valve stem and a suitable handle or lever connected with the shaft outside the casing, whereby said shaft may be rocked to open or close the valve, substantially as described.

5. In combination with a faucet having a valve therein and means for opening and closing said valve, a nozzle formed with an approximately spherical chamber, a deflector centrally supported in said chamber at intervals, so that passages will be formed above and around said deflector, so that the liquid passing out of said nozzle will pass over and around the deflector to the open end of said nozzle, substantially as and for the purpose set forth.

In testimony whereof I affix my signature in presence of two witnesses.

ABRAM W. WHEATON.

Witnesses:
ALBERT C. PEDRICK,
A. CLAYTON.